United States Patent
Knowlton

(10) Patent No.: US 8,994,321 B2
(45) Date of Patent: Mar. 31, 2015

(54) METHOD AND SYSTEM FOR RATIONING CHARGE OR ENERGY PROVIDED TO A PORTABLE DEVICE

(75) Inventor: Timothy J. Knowlton, Benson, AZ (US)

(73) Assignee: Standard Microsystems Corporation, Hauppague, NY (US)

( * ) Notice: Subject to any disclaimer, the term of this patent is extended or adjusted under 35 U.S.C. 154(b) by 148 days.

(21) Appl. No.: 13/157,282

(22) Filed: Jun. 9, 2011

(65) Prior Publication Data
US 2012/0313571 A1  Dec. 13, 2012

(51) Int. Cl.
*H02J 7/00* (2006.01)

(52) U.S. Cl.
CPC .............. *H02J 7/007* (2013.01); *H02J 7/0083* (2013.01); *H02J 2007/0037* (2013.01)
USPC ............................ 320/107; 320/106; 320/114

(58) Field of Classification Search
CPC ................................. H02J 7/042; H02J 7/0042
USPC ........................................................ 320/107
See application file for complete search history.

(56) References Cited

U.S. PATENT DOCUMENTS

| | | | | |
|---|---|---|---|---|
| 4,564,798 A | * | 1/1986 | Young | 320/103 |
| 5,432,429 A | * | 7/1995 | Armstrong et al. | 320/136 |
| 5,440,221 A | * | 8/1995 | Landau et al. | 320/155 |
| 5,504,413 A | * | 4/1996 | Fernandez et al. | 320/163 |
| 5,508,599 A | * | 4/1996 | Koenck | 320/138 |
| 5,872,561 A | * | 2/1999 | Figie et al. | 345/168 |
| 5,929,604 A | * | 7/1999 | Irvin | 320/136 |
| 6,377,028 B1 | * | 4/2002 | Armstrong et al. | 320/136 |
| 6,495,989 B1 | * | 12/2002 | Eguchi | 320/132 |
| 6,498,460 B1 | * | 12/2002 | Atkinson | 320/135 |
| 6,665,801 B1 | * | 12/2003 | Weiss | 713/300 |
| 7,430,679 B2 | * | 9/2008 | Tevanian, Jr. | 713/324 |
| 7,750,601 B2 | * | 7/2010 | Lu | 320/125 |
| 7,944,214 B2 | * | 5/2011 | Laraia et al. | 324/527 |
| 2003/0030412 A1 | * | 2/2003 | Matsuda et al. | 320/127 |
| 2005/0156577 A1 | * | 7/2005 | Sully | 320/160 |
| 2006/0181241 A1 | * | 8/2006 | Veselic | 320/107 |
| 2007/0236169 A1 | * | 10/2007 | Purdy et al. | 320/106 |
| 2010/0066303 A1 | * | 3/2010 | Lam et al. | 320/106 |
| 2010/0146307 A1 | * | 6/2010 | Griffin et al. | 713/300 |
| 2011/0187314 A1 | * | 8/2011 | Kim | 320/107 |

* cited by examiner

*Primary Examiner* — Samuel Berhanu
*Assistant Examiner* — Jerry D Robbins
(74) *Attorney, Agent, or Firm* — King & Spalding L.L.P.

(57) ABSTRACT

A charging method and system for rationing charge or energy supplied by a host to a portable device. The system includes a power switch connected to a current sensing module that detects instantaneous current drawn by the portable device. A current register connected to the current sensing module stores the instantaneous current value. A timing module generates timing information. A cumulative charge value obtained by multiplying the instantaneous current value with the timing information is stored in a charge register. Further, a cumulative energy value may be obtained by multiplying the cumulative charge value with a detected voltage value. A threshold database stores a threshold value, and a rationing module connected to the host and the charge register continuously compares the cumulative charge value and/or the cumulative energy value with the threshold charge value. A control signal is generated when the threshold charge value is exceeded.

30 Claims, 5 Drawing Sheets

METHOD AND SYSTEM FOR RATIONING CHARGE OR ENERGY PROVIDED TO A PORTABLE DEVICE

TECHNICAL FIELD

The present disclosure relates to computing devices, and more particularly to systems and methods for charging portable devices connected to host devices.

BACKGROUND

Portable electronic devices such as MP3 players, cameras, and cell phones are typically fitted with a USB port, which allows them to transfer data to or from other controllers or hosts, such as personal computers, notebooks, or televisions. Using these USB ports, portable devices may also charge their batteries by conveniently drawing current from the host.

Though this development greatly helps minimize the size of portable devices, it creates a few problems for the host. Most hosts typically work in multiple power modes such as fully-functional mode, sleep mode, hibernation mode, or shutdown mode. In each power mode the host draws a specific amount of current from its power supply (AC supply or battery). For example, in sleep mode (also referred to as "standby mode" or "suspend mode"), power is not supplied to any system components except the system RAM, substantially reducing power consumption as compared to the fully-functional mode. Typically, in hosts that run on battery (e.g., notebook), power consumption and available battery life is a primary operational concern, and therefore these systems may be configured to enter the sleep mode whenever the notebook is idle for a specified period. But, when a portable device connects to the host running on batteries (or in the sleep mode), the host may be forced to charge the portable device from its own depleted batteries, irrespective of the charge remaining in the host's battery.

Some of the present portable hosts attempt to restrict the charge drawn from the host when the host enters the sleep mode. One such host completely terminates current supply to USB ports in the sleep mode. Though this restriction is beneficial for the host, it may be detrimental for the portable device, as the portable device may not even have sufficient charge to make an emergency call. Another method initiates an internal timer when an attached portable device begins drawing current. The timer may be hard-coded or programmable. When the timer expires the host stops supplying current to the portable device. This solution, however, introduces some limitations. Because different portable devices draw charge at different rates, it is difficult to ascertain the charge drawn in the stipulated time. If the timer is set for a very short duration, the charge drawn by a device at the rate of 100 mA may not be enough to even power on the device. Alternatively, if the timer is set for a longer period, a device that draws 1A current may drain the host's battery in the stipulated time.

Therefore, there exists a need for a suitable method and system to ration the charge or energy drawn by a portable device.

SUMMARY

Briefly described, and according to one embodiment, the present disclosure describes a charging system for rationing current supplied by a host to a portable device. The system includes a power switch and a current sensing module connected to the power switch. The current sensing module detects the instantaneous current drawn by the portable device. The system further includes a current register connected to the current sensing module for storing the instantaneous current value. A timing module generates timing information. The system also includes a charge register storing a cumulative charge drawn by the portable device. The cumulative charge may be obtained by multiplying the instantaneous current value with the timing information. A threshold database included in the system stores a threshold value and a rationing module connected to the host and the charge register continuously compares the cumulative charge value with the threshold charge value, and generates a control signal when the cumulative charge value exceeds the threshold charge value.

According to another embodiment, the present disclosure describes a method for rationing the charge supplied by a host to a portable device over a universal serial bus (USB) port. The method includes the steps of sensing the instantaneous current drawn by the portable device and storing the instantaneous current value. The method further includes the steps of multiplying the current value with time to obtain a cumulative charge value, continuously updating the charge value, and continuously comparing the updated charge value with a threshold value. When the cumulative charge value exceeds the threshold value, the method further includes the step of generating a control signal.

Figure 1:
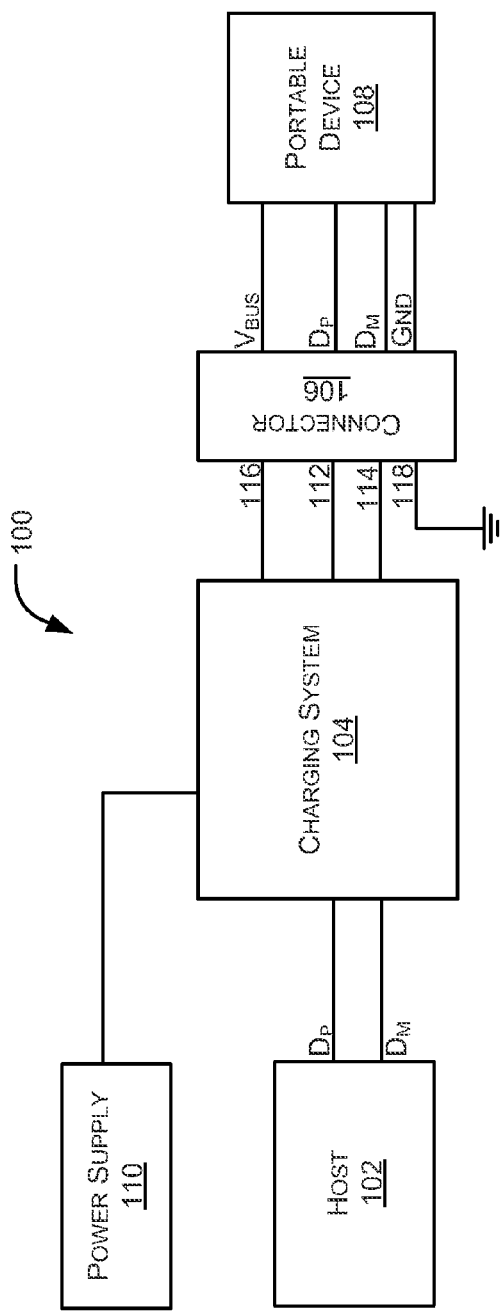
FIG. 1 is a block diagram illustrating an exemplary system where embodiments of the present disclosure may function.

While the disclosure is amenable to various modifications and alternative forms, specific embodiments are shown by way of example in the drawings and are described in detail. It should be understood, however, that the drawings and detailed description thereto are not intended to limit the disclosure to the particular form disclosed, but on the contrary, the intention is to cover all modifications, equivalents, and alternatives falling within the spirit and scope of the present disclosure as defined by the appended claims.

DETAILED DESCRIPTION

Overview

The following terms are used throughout this document and are defined here for clarity and convenience.

Attach refers to a physical electrical connection between a downstream device and an upstream port.

Connection refers to the state in which a downstream device is attached to an upstream port and the downstream device has pulled either $D_P$ (Data Plus) or $D_M$ (Data Minus) signals high through a resistor, in order to enter signaling.

Disconnect refers to the loss of active USE communication between a USE host and a USE device.

Legacy Device may be a USE device that requires application of non-BCS signatures on the $D_P$ and $D_M$ pins to enable charging.

Downstream Device is a USE device connected on the $D_P$ and $D_M$ pins of a host device and that acts as a slave to the host device.

Charger Emulation Profile refers to the reactive handshake applied on the $D_P$ and $D_M$ pins to emulate a specific charger type such as a BCS Charging Downstream Port or a legacy dedicated charger device.

USB Charger includes a device with a dedicated charging port, such as a wall adapter or a car power adapter.

Portable Device refers to any USE or on-the-go (OTG) device that is capable of operating from its own battery and is also capable of drawing current from its USB port for the purpose of operating and/or charging its battery.

Embodiments of the present disclosure are directed to a battery charging system and method for rationing charge or energy drawn by a portable device over a USB port. Rationing charge (or energy) allows a host to preserve its batteries in sleep mode or when they are running low, while also supplying sufficient charge to a connected portable device to at least power on or make emergency calls. Rationing may be carried out by comparing the drawn charge (or energy) value with a threshold value (set by the host). When the drawn value exceeds this threshold value, the charging system either alerts the host or stops charging the connected portable device.

Exemplary Charging Network

FIG. 1 is a block diagram illustrating an exemplary charging network 100 where embodiments of the present disclosure may operate. The network 100 includes a host 102, a charging system 104, a USB connector 106, a portable device 108, and a power supply 110. The connector 106 attaches the portable device 108 to the charging system 104. This system 104 is, in turn, connected to the host 102. The power supply 110 provides current to the charging system 104 and the portable device 108 (through the charging system 104)

The USB connector 106 and the charging system 104 further include 4 pins–Data (plus) DP 112, Data (minus) DM 114, Voltage VBUS 116, and Ground GND pin 118. Data is transferred to and from the portable device 108 through the data pins. The power supply 110, providing current and voltage, is connected to the charging system 104 through the $V_{BUS}$ pin 116. GND 118 connects the USB connector 106 to ground.

The host 102, the charging system 104, and the connector 106 may be part of a host device. When the portable device 108 connects to the host device, through the connector 106 and the charging system 104, it may begin to draw charging current. To control the amount of charge supplied to the portable device, the charging system 104 rations the charge according to one or more parameters. The rationing operation of the charging system will be described in detail with reference to FIGS. 2-5.

The host 102 may include any computing device such as notebooks having its own battery power, or any computing device connected to an external AC power supply such as personal computers, televisions, set top boxes, music players, etc. Moreover, the host 102 device may function in a multiple power triodes such as full power, idle, sleep, hibernate, or shutdown mode. In each mode, the power consumed by the host 102 device may vary.

The charging system 104 may be a downstream USB port. Moreover, the charging system 104 may be compatible with the battery charging specification 1.1 or 1.2. Alternatively, the charging system 104 may be compatible with non-BSC compatible legacy devices, such as Apple® or Blackberry® portable devices. According to another embodiment, the port may include an emulation circuit that allows the port to emulate any known or configurable charging ports making the port compatible with any portable device available.

The power supply 110 may be a part of the host 102. Alternatively, the power supply 110 may be a separate unit directly supplying charge to the portable device 108. Moreover, the power supply may be a DC power source or an AC source. In case, the power supply is an AC power source, the host or the charging system convert the power into a DC source before supplying it to other circuit elements.

Exemplary Charging System

Figure 2:
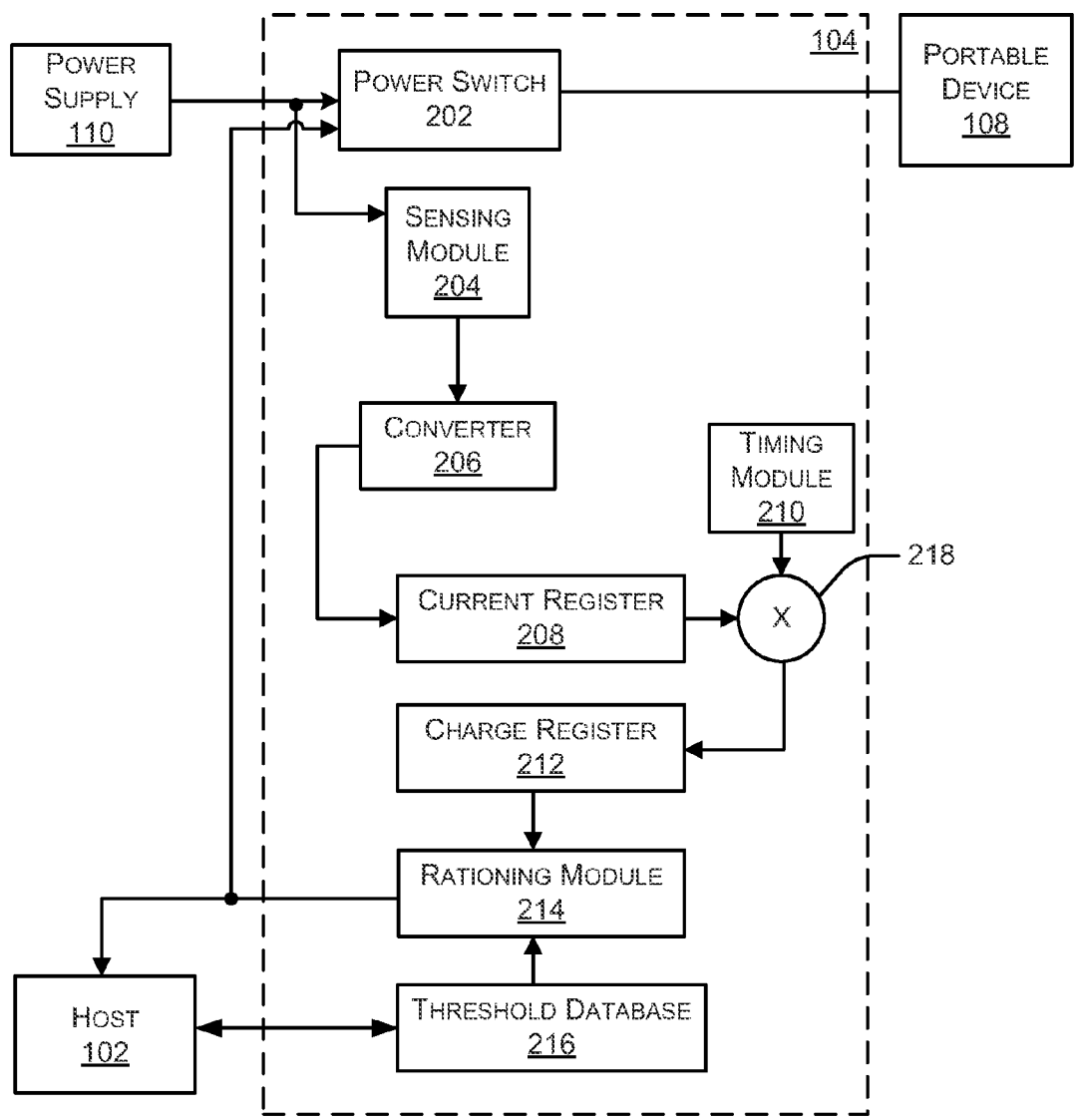
FIG. 2 illustrates an exemplary charging system according to embodiments of the present disclosure.

FIG. 2 illustrates the charging system 104, in detail, according to some embodiments of the present disclosure. As described previously, the charging system 104 connects the host 102 to the portable device 108 and allows the portable device 108 to drawn power from the power supply 110. In addition, according to some embodiments of the present invention, the charging system 104 also rations the charge or energy flowing from the power supply 110 to the portable device 108. To ration the current, the charging system senses the current flowing to the portable device, estimates total charge supplied to the portable device, and stops supply to the portable device once the total charge exceeds a preconfigured threshold value. To this end, the charging system 104 includes a power switch 202, a current sensing module 204, a converter module 206, a current register 208, a timing module 210, a charge register 212, a rationing module 214, and a threshold database 216. These elements may be implemented as separate interconnected modules within the charging system 104. Alternatively, these elements may be implemented as a single semiconductor fiber chip, such as an application specific integrated circuit (ASIC) or a system on chip (SoC).

The power switch 202 receives current from the power supply 110 and provides it to the portable device 108 through the $V_{BUS}$ pin. The current sensing module 204, connected between the power switch 202 and converter 206, detects the current drawn by the portable device 108 from the power switch 202. The sensing module 204 supplies the detected current signal to the converter 206, which converts the analog current signal into a digital current value. The output of the converter (digital current value) is stored in the current register 208, and presented to a multiplier register 218. The multiplier register 218 further receives an input from the timing module 210. Both these inputs are multiplied to obtain a cumulative charge value, which is then stored in the charge register 212. Output from the charge register 212 together with a threshold value obtained from the threshold database 216, is supplied to the rationing module 214. This module compares the threshold value and the cumulative charge value to generate a control signal, which is utilized to take one or more decisions regarding charging of the portable device 108. In the following paragraphs, each module will be described in detail.

The current sensing module 204 detects the instantaneous current drawn by the portable device. This current may be sensed at predetermined intervals or when the portable device begins drawing current. In one embodiment, the current sensing module 204 may include circuitry such as an input current amplifier 220 and a current sensing resistor 222. The current sensing resistor 222 converts the current into a corresponding voltage signal. It will be understood that any other circuitry or additional circuitry now known or available in the future may just as easily be used to detect the instantaneous current. Moreover, this module may be implemented within the power switch 202. Alternatively, the current sensing module 204 may include circuitry that is not part of the power switch 202, but connected to it.

The converter 206, connected at the output of the current sensing module 204, converts the voltage signal corresponding to the instantaneous current into a corresponding digital current value. Because the charge supplied to the portable device 108 increases over time, it is preferable to store the instantaneous current value to estimate total charge drawn over time. Therefore, the current value is converted into a digital value for storing. A suitable analog to digital converter (ADC) may be utilized for this conversion. For example, a flash ADC, a successive approximation ADC, or a ramp-compare ADC may be utilized.

The current register 208 stores the digital current value generated by the converter. It will be understood that the current sensing module 204 may periodically or continuously sense the current drawn by the portable device 108, and therefore, the digital current value in the register 208 may be updated in real time. The registers may be first-in first-out (FIFO) registers that store the latest values and discard previous values. Alternatively, the register may store all the digital values with the latest value on top. In one embodiment, the registers may only handle one digital value at a time. All previous values may be discarded when a new value is pushed into the register. Further, the registers may be resettable as required.

The timing module 210 measures the time elapsed from the time the portable device 108 begins drawing current to real time. Any known clock circuit may be utilized here. Moreover, a commonly known timer may also be utilized without departing from the scope of the present invention. This elapsed time information is utilized to calculate the cumulative charge value. Charge is a product of instantaneous current and time. For example, if the instantaneous current sensed is 500 mA, the charge accumulated in 5 minutes would be 0.04 Ah. The charging system utilizes a multiplier 218 to combine the digital current value and the elapsed time to determine the cumulative charge value. The multiplier 218 may be a digital register or an analog circuitry.

The rationing module 214 compares the continuously updating cumulative charge value with a threshold charge value stored in the threshold database 216. The host may provide the threshold value to the charging system 104 through a data communication bus. This threshold value is supplied to the rationing module 214 for the comparison. The rationing module 214 may include a suitable discrete comparator to compare the values. Alternatively, the values may be compared digitally. When the cumulative charge value exceeds the threshold charge value, the rationing module 214 generates a control signal that may include a disable signal to disable the power switch 202 or an alert signal to inform the host 102 that the threshold charge value is exceeded. In case an alert signal is generated, the host 102 may take any suitable action as it sees fit. For example, the host 102 may instruct the portable device 108 to disable the power switch 202, or cutoff the power supply 110 to the battery charging port itself. In some situations, during the time elapsed to exceed the threshold charge value, a user may connect an external supply to charge the host's batteries, or the host 102 may come out of its steep mode. In these situations, the host 102 may withdraw the charge threshold value upon receiving the alert signal, and allow the portable device 108 to draw as much charge as required. In this case, the charging system 104 may simply store the sensed current value and the cumulative charge value without comparing these values with any threshold value.

The threshold charge value is determined based on one or more criteria, such as remaining battery life or the current power mode. For example, if the host 102 has 20% battery life remaining, the host 102 may decide to grant 5 Ah charge to charge any auxiliary device that is connected to the host 102. Alternatively, just before going into sleep mode, the host 102 may choose to offer a charge of 1 Ah for the duration the host 102 is in the sleep mode. It will be understood that the host 102 may determine the threshold value based on any other criteria without departing from the scope of the present disclosure. For instance, the threshold value may be dependent on host usage patterns, charging patterns, and so on.

In one embodiment, the host 102 may include a lookup table that includes predetermined threshold values corresponding to the battery life, or it may include threshold values corresponding to different power modes. Every time the host 102 detects a portable device through the charging system 104, the host 102 may automatically set a threshold value depending on the host's current state. Alternatively, this lookup table may be present within the charging system 104. Then, each time a connection is detected, the host 102 sends its present state values to the charging system 104, which determines the appropriate threshold charge value itself.

Figure 3:
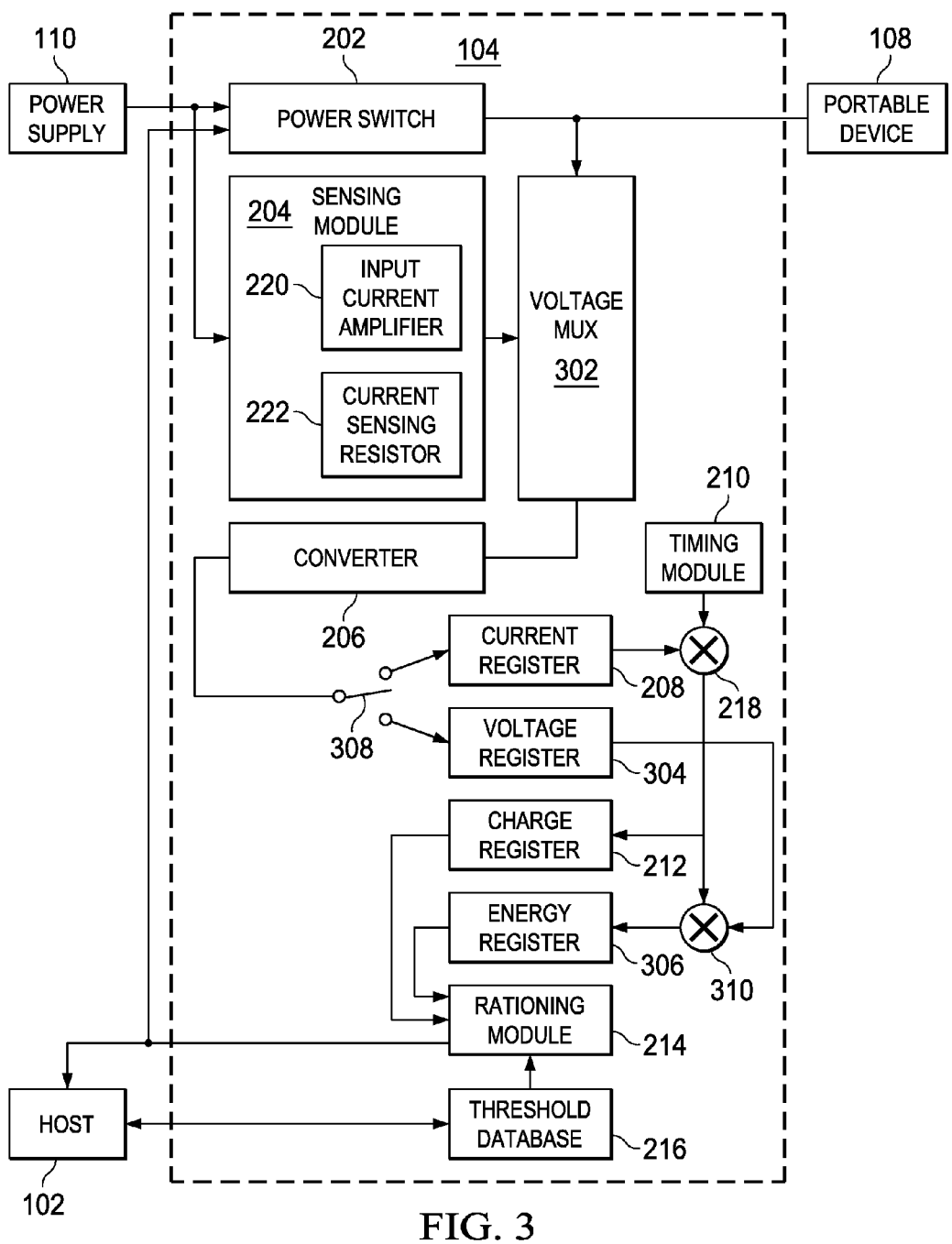
FIG. 3 illustrates another exemplary charging system according to embodiments of the present disclosure.

FIG. 3 illustrates an alternative embodiment of the charging system 104. Here, the charging system 104 compares the total energy supplied to the portable device with a threshold energy value. So, in addition to sensing current, the charging system 104 also detects voltage in this embodiment. The instantaneous voltage and current can then be used to calculate a cumulative energy value. To sense voltage and calculate cumulative energy, the charging system 104 includes a voltage multiplexer 302, a voltage register 304, and an energy register 306, in addition to the previously described modules.

The sensed voltage from the $V_{BUS}$ pin 116 is provided to the voltage multiplexer 302 along with the voltage signal corresponding to the instantaneous current. The multiplexer 302 serially outputs the two voltage signals to the converter 206, which converts these values into digital signals before storing them in the current register 208 and the voltage register 304 respectively. A high-speed switch, such as switch 308 may be employed between the current and voltage resisters to route the correct value in the correct register. To obtain the cumulative energy value, the digital voltage value is combined with the cumulative charge value in multiplier 310. The resulting energy value is stored in the energy register 306. The real time cumulative energy value is compared continuously or at intervals with the threshold value. Once the detected energy exceeds the threshold value, similar to the previous embodiment, the rationing module 214 either disables the power switch 202, alerts the host 102, or does both.

It will be understood that the charging system 104 described with reference to FIGS. 2 and 3 allows the host 102 to actively choose the charge or energy it wishes to allocate for charging auxiliary portable devices. Moreover, at regular intervals or at predetermined times, the charging system 104 may communicate the instantaneous current or voltage value, and cumulative charge or energy value to the host. So, even when the host 102 does not want to ration the charge or energy supplied to the portable device 108, the instantaneous current or voltage values, the host 102 may utilize these values to make certain other decisions. In one embodiment, the host 102 may display the portable device's charging characteristics on the host's display device so that users may be aware of the portable device's charging capacity and disconnect the device when charging is complete. Furthermore, the displayed rate of charging help users determine whether the portable device 108 has correctly identified the USB port and is drawing sufficient current or not.

FIGS. 2 and 3 illustrate exemplary modules and circuits to ration the charge or energy. It will be understood that other components (analog, discrete, or digital) may be utilized in place of the described components or in addition to these components to achieve the same result. These additional components are not beyond the scope of the present disclosure, and may be utilized just as easily. For example, the actual circuitry for the sensing module and the timing module may vary considerably from the circuitry described with reference to FIGS. 2 and 3.

Exemplary Methods

Figure 4:
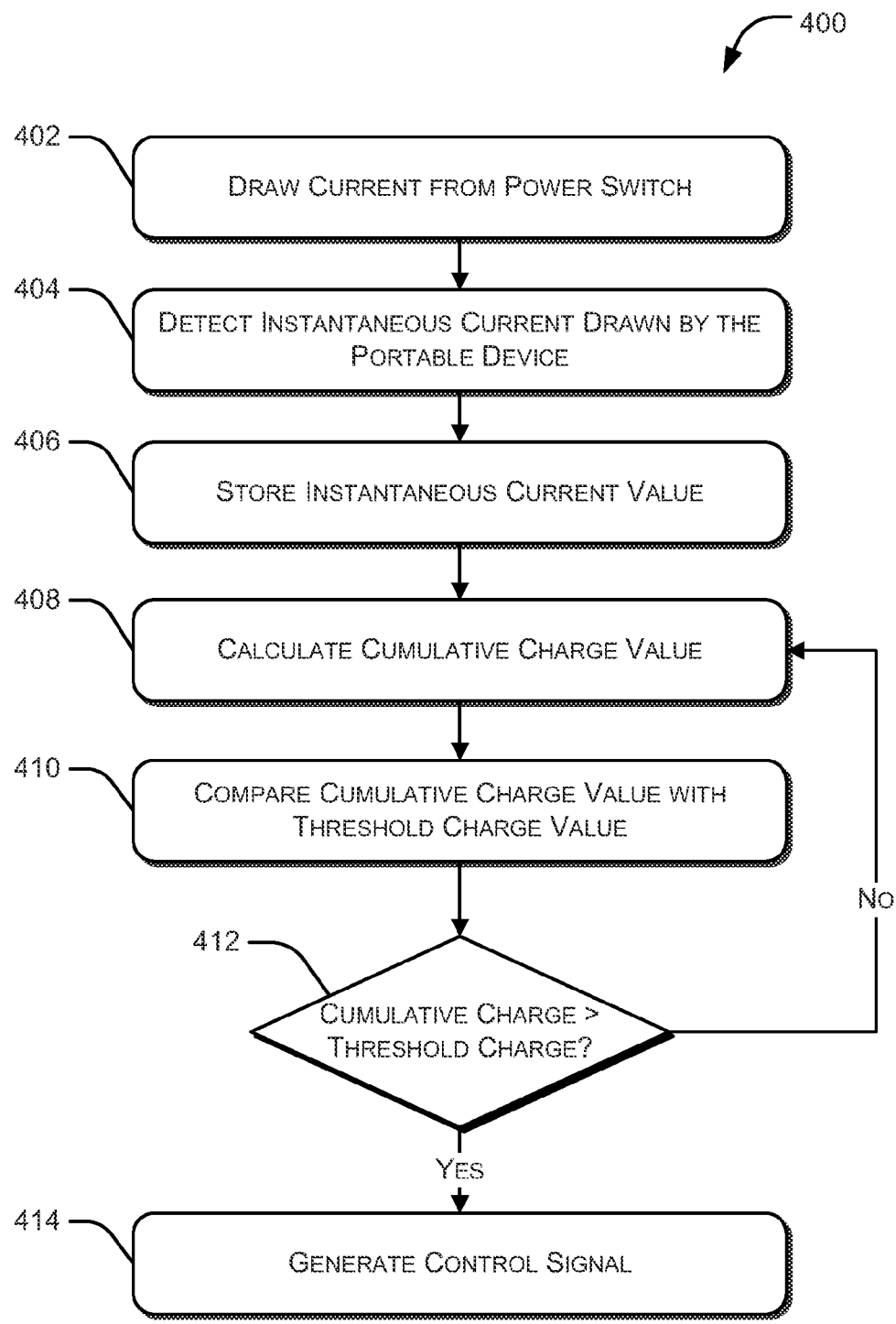
FIG. 4 is a flow chart depicting an exemplary method for rationing charge supplied to a portable device according to some embodiments of the present disclosure.

FIG. 4 illustrates an exemplary method 400 for rationing charge supplied by a host to a portable device over a USB port. The method 400 illustrated in FIG. 4 may be used in conjunction with any of the systems or devices shown in the previously described figure, among other devices. In various embodiments, some of the method elements shown may be performed concurrently, in a different order than shown, or may be omitted. Additional method elements may be performed as desired. As shown, the method 400 may operate as follows.

At step 402, the portable device 108 begins drawing current from the power switch 202. As described previously when a portable device is attached to a USB port, it first identifies the port type and then performs a handshake based on the detected port type. If the handshake is successfully completed, the portable device 108 begins drawing current based on the detected port type and the portable device 108 type.

Next, the current sensing module 204 detects the instantaneous current drawn by the portable device 108. The current is converted into a corresponding voltage Connecting a current sensing resistor at the input of the power switch 202 may perform this transformation. Other circuit components may just as easily be used instead to sense the current and convert it into a voltage signal.

At step 406, the converter 206 converts the voltage signal into a digital current value. The digital current value is stored in the current register 208. The charging system 104 may sense the instantaneous current continuously, at regular intervals, or just once when the portable device 108 begins drawing current. In case the current is continuously or intermittently measured, the register 208 value may be constantly updated. In case the current is sensed only at the beginning, the register 208 is not updated while the portable device 108 is connected to the charging port. Once the portable device 108 is disconnected, the register 208 may be reset to accept a new current value when a second portable device is connected to the charging system 104.

The current value is converted into a charge value and stored in the charge register 212 at step 408. When the current sensing module first detects the current, the timing module 210 begins gauging the time elapsed from charging initiation. The multiplier 218 multiplies the elapsed time with the digital current value to obtain the cumulative charge value. The multiplier 218 may be programmed to carry out the multiplication continuously, or at regular intervals. Moreover, the cumulative charge updating interval may vary based on the stored digital current value and the threshold value. For example, if the instantaneous current value is 100 mA and the threshold charge value is 10 Ah, the multiplier may be configured to calculate the cumulative charge value every 5 minutes, instead of every 5 seconds. The calculated charge value is then updated in the charge register 212 every 5 minutes.

Next (step 410), the updated charge value is compared with the threshold charge value. This comparing may also occur in accordance with the rate at which the charge value is updated. If, at step 412, the updated cumulative charge value exceeds the threshold value during one of the comparisons, the rationing module, at step 414, generates a control signal. This control signal may disable the power switch 202 so that the power supply 110 stops supplying current to the portable device 108. Alternatively, the control signal may be an alert signal that interrupts and informs the host 102 that the threshold has been exceeded. The host 102 may then take one or many possible actions. For example, the host 102 may decide to stop offering current to the portable device 108. Alternatively, if the host's conditions have changed since the last threshold value (the host 102 may be connected to an AC power supply or may have exited a sleep mode), the host 102 may either set a new threshold value or remove the previously set threshold value. In this case, the charging system 104 may compare the charge value with the newly set charge threshold or stop comparing the stored charge value.

If the cumulative charge value does not exceed the threshold (no path from step 412), the method 400 returns to step 408 and calculates the cumulative charge value again.

At regular intervals, while charging the portable device 108, the battery charging module may communicate charging updates to the host 102 in the form of instantaneous current values and cumulative charge values.

Figure 5:
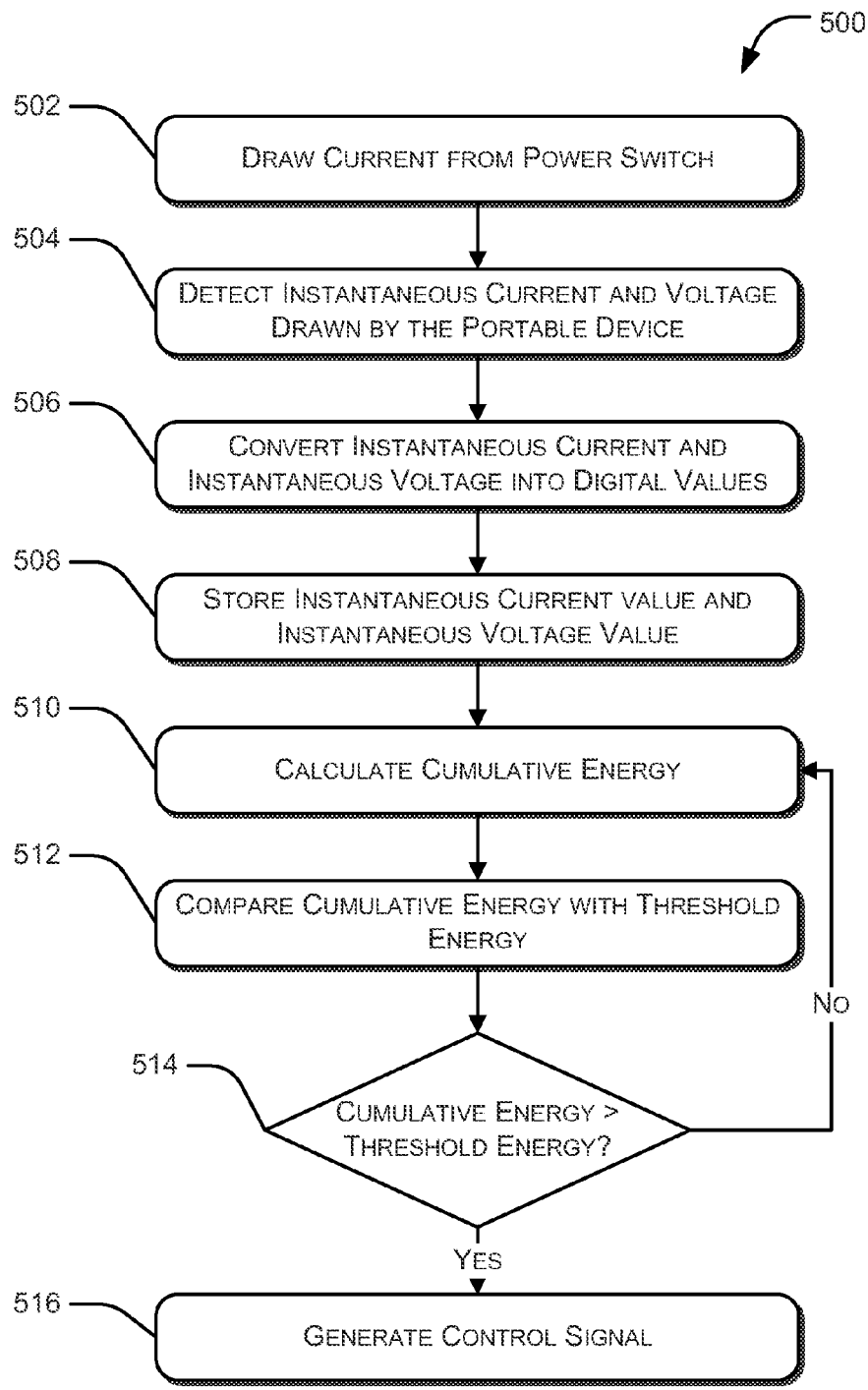
FIG. 5 is a flow chart illustrating another exemplary method for rationing charge supplied to a portable device according to some embodiments of the present disclosure.

FIG. 5 illustrates an exemplary method 500 for rationing energy supplied to a portable device. The host 102 device may set a threshold energy value and provide this information to the charging system 104 through a data communication bus.

At step 502 the portable device 108 begins drawing current from the charging system 104. Next, (step 504) the instantaneous current and voltage are sensed. The instantaneous current may be sensed in a similar fashion as described in step 404. The instantaneous voltage is sensed from the output of the power switch 202 (VBUS pin 116). Then the instantaneous voltage and the corresponding voltage are provided to the converter 206 at step 506. If both the current and voltage values are sensed together, they may be supplied to the 206 simultaneously. To overcome this conflict, a voltage multiplexer 302 may be utilized at the converter's input. The multiplexer received both the voltage signals, and serially outputs the signals to the converter 206. The digital values generated by the converter are stored in the current register 210 and voltage register 304 respectively, at step 508.

At step 510, the cumulative energy value is calculated. Cumulative energy is a product of the instantaneous voltage, instantaneous current, and the elapsed time. In one embodiment, the multiplier 218 multiplies the cumulative charge value (instantaneous current X time elapsed) with instantaneous voltage to obtain the cumulative energy value. Alternatively, the multiplier 218 may multiply the instantaneous current and voltage with the time elapsed to determine the cumulative energy. Suitable multipliers (such as hardware circuits or software registers) may be employed to carry out these conversions. As the instantaneous current and voltage values are stored in a digital format in registers, the cumulative energy calculation can take place completely in software or digital registers. This step may repeat continuously or at predetermined intervals.

Next (step 512), the cumulative energy value may be compared with the threshold energy value. If the total energy exceeds the threshold value (yes path from step 514), the rationing module 214 generates a control signal at step 516. Alternatively, the rationing module 214 keeps comparing updated cumulative energy values with the threshold until the cumulative value exceeds the threshold. The operation of the control signal may be similar to that described with reference to FIG. 4.

The methods and systems discussed in the present disclosure allow a host to ration the charge or energy supplied to a portable device based on one or more host conditions. Conditions may include remaining host battery life, expected usage patterns, power state, and so on.

Those in the art will understand that the steps set out in the discussion above may be combined or altered in specific adaptations of the disclosure. The illustrated steps are set out to explain the embodiment shown, and it should be anticipated that ongoing technological development will change the manner in which particular functions are performed. These depictions do not limit the scope of the present disclosure, which is determined solely by reference to the appended claims.

What is claimed is:

1. A system for rationing a cumulative charge or a cumulative energy, the system comprising:
   a host coupled with a charging system,
   a power supply and a connector operable to be connected with a portable device comprising a battery, wherein the host system is operable to charge the battery of the portable device when the portable device is connected with the charging system through the connector, wherein the host, charging system, the power supply and the connector are part of another portable device and the power supply is a host battery of the another portable device, wherein the charging system comprises:
   a power switch coupled with the power supply and the connector;
   a current sensing module, connected to the power switch, for detecting an instantaneous current drawn by the portable device during a charging process;
   a converter, at the output of the current sensing module, for converting the instantaneous current into a digital current value representing the instantaneous current drawn by the portable device;
   a current register connected to the current sensing module for storing the digital current value representing the instantaneous current drawn by the portable device;
   a timing module generating elapsed time information;
   a charge register storing a cumulative charge value, the cumulative charge value representing a cumulative current drawn by the portable device during the charging process, and obtained by multiplying the digital current value representing the instantaneous current drawn by the portable device with the elapsed time information;
   a threshold database storing a threshold value representing a total charge or total energy to be drawn by the portable device, wherein the threshold database obtains a threshold value from the host via a data communication bus and wherein the threshold value is calculated by the host based on an available charging capacity of the host battery and the operating mode of the host; and
   a rationing module configured for:
      continuously comparing a cumulative value with the threshold value representing the total charge or total energy to be drawn by the portable device, wherein the cumulative value is the cumulative charge value or is calculated based on the cumulative charge value; and
      generating a control signal when the cumulative value exceeds the threshold value.

2. The system of claim 1 further comprising a first multiplier, connected to the output of the current register for multiplying the digital current value with the elapsed time information.

3. The system of claim 2, wherein the current sensing module includes a current sensing resistor converting the instantaneous current into a corresponding voltage signal.

4. The system of claim 3 further comprising:
   a voltage multiplexer, connected to the output of the power switch and the current sensing module, for multiplexing the corresponding voltage signal and an instantaneous voltage;
   a voltage register for storing a digital voltage value; and
   an energy register for storing a cumulative energy value obtained by multiplying the cumulative charge value with the digital voltage value.

5. The system of claim 4 further comprising a second multiplier connected to the output of the first multiplier and the voltage register, for generating the cumulative energy value.

6. The system of claim 4 further comprising a switch connected to the input of the current register and the voltage register.

7. The system of claim 4, wherein the cumulative value is at least one of the cumulative charge value or the cumulative energy value.

8. The system of claim 1, wherein the control signal is at least one of a disable signal or an alert signal.

9. The system of claim 1, wherein the current sensing module and the rationing module are implemented in discrete circuitry.

10. The system of claim 1, wherein the current sensing module and the rationing module are components on a single semiconductor chip.

11. A method for rationing a cumulative charge or energy supplied from a host to a portable device over a universal serial bus (USB) port, the method comprising:
   coupling a portable device comprising a battery with a host system, wherein the host system comprises a host and a charging system operable to charge the battery of the portable device from a power supply of the host system wherein the power supply is a host battery;
   sensing an instantaneous current drawn by the portable device from the power supply of the host;
   converting the instantaneous current into a digital current value representing the instantaneous current drawn by the portable device during a charging process;
   storing the digital current value representing the instantaneous current drawn by the portable device;
   determining an elapsed time from beginning of charging to current time;
   multiplying the digital current value representing the instantaneous current drawn by the portable device with the elapsed time to obtain a cumulative charge value representing a cumulative current drawn by the portable device during the charging process;
   storing the cumulative charge value representing the cumulative current drawn by the portable device during the charging process;
   storing a threshold value representing a total charge or total energy to be drawn by the portable device, wherein the threshold value has been received from the host and wherein the threshold value is calculated by the host based at least on an available charging capacity of the host battery and the operating mode of the host system;
   comparing a cumulative value with the threshold value representing the total charge or total energy to be drawn by the portable device, wherein the cumulative value is the cumulative charge value or is calculated based on the cumulative charge value; and generating a control signal if the cumulative value exceeds the threshold value.

12. The method of claim 11 further comprising updating the cumulative charge value at predetermined intervals.

13. The method of claim 11 further comprising:
converting the instantaneous current into a corresponding voltage signal; and
converting the corresponding voltage signal into the digital current value.

14. The method of claim 13 further comprising:
detecting an instantaneous voltage supplied to the portable device;
converting the instantaneous voltage into a digital voltage value storing the digital voltage value;
multiplying the digital voltage value with the cumulative charge value, in real time, to determine a cumulative energy value; and
continuously updating the cumulative energy value.

15. The method of claim 14 wherein comparing the cumulative value with the threshold value comprises comparing at least one of the cumulative energy value or the cumulative charge value with the threshold value.

16. The method of claim 15 further comprising multiplexing the corresponding voltage signal and the instantaneous voltage.

17. The method of claim 11 further comprising at least one of disabling a power switch supplying current to the portable device; disabling the power switch supplying current to the portable device and alerting the host; or alerting the host.

18. The system of claim 8, wherein the disable signal terminates charging of the portable device battery.

19. The system of claim 18, wherein the another portable device is a notebook computer.

20. The method of claim 11, wherein the host system is in a sleep mode and said control signal is used to wake up the host system.

21. The method of claim 20, wherein the another portable device is a notebook computer.

22. The method according to claim 20, wherein the host system withdraws the threshold value upon receiving the control signal if it determines that an external power supply is connected with the host system to charge the host battery.

23. The system according to claim 1, wherein different threshold values are assigned just before going into sleep mode.

24. The system according to claim 1, wherein operating modes includes a full power mode, an idle mode, and a sleep mode.

25. The system according to claim 1, wherein the operating modes further includes a hibernating mode, a transition to sleep mode, and a shutdown mode.

26. The system according to claim 1, wherein the threshold value is determined depending on a host usage pattern.

27. The method according to claim 11, wherein different threshold values are assigned just before going into sleep mode.

28. The method according to claim 11, wherein operating modes includes a full power mode, an idle mode, and a sleep mode.

29. The method according to claim 11, wherein the operating modes further includes a hibernating mode, a transition to sleep mode, and a shutdown mode.

30. The method according to claim 11, wherein the threshold value is determined depending on a host usage pattern.

* * * * *